United States Patent [19]
Kullman et al.

[11] 3,975,370
[45] Aug. 17, 1976

[54] METHYLOLATED REACTION PRODUCT OF A HYDROXY CARBAMATE AND A CELLULOSE-DYEING DYESTUFF CONTAINING VINYL SULFONE GROUPS

[75] Inventors: Russell M. H. Kullman, Metairie; Robert M. Reinhardt, New Orleans, both of La.

[73] Assignee: The United States of America as represented by the Secretary of Agriculture, Washington, D.C.

[22] Filed: Sept. 17, 1974

[21] Appl. No.: 506,933

Related U.S. Application Data

[62] Division of Ser. No. 143,168, May 13, 1971, Pat. No. 3,873,513, which is a division of Ser. No. 791,697, Aug. 6, 1968, abandoned.

[52] U.S. Cl. ............................... 260/151; 260/153; 260/185; 260/191; 260/249
[51] Int. Cl.² .................. C09B 45/18; C09B 62/08; C09B 62/82
[58] Field of Search ........... 260/148, 149, 150, 151, 260/147, 146 R, 146 D, 146 T

[56] References Cited
UNITED STATES PATENTS

| | | | |
|---|---|---|---|
| 2,870,137 | 1/1959 | Merian et al. ................ | 260/207 |
| 3,009,909 | 11/1961 | Kaeding ....................... | 260/207 |
| 3,072,454 | 1/1963 | Long et al. .................... | 260/153 X |
| 3,114,745 | 12/1963 | Lodge et al. .................. | 260/147 |
| 3,135,730 | 6/1964 | Heyna et al. .................. | 260/147 |
| 3,152,111 | 10/1964 | Taber ........................... | 260/153 |
| 3,218,310 | 11/1965 | Benz et al. .................... | 260/154 |
| 3,248,379 | 4/1966 | Stanley ......................... | 260/199 |

*Primary Examiner*—Floyd D. Higel
*Attorney, Agent, or Firm*—M. Howard Silverstein; David G. McConnell; Salvador J. Cangemi

[57] ABSTRACT

The invention provides a cellulose-dyeing dyestuff having the formula

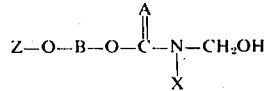

wherein Z is the chromophoric radical of a cellulose-dyeing dyestuff containing a vinyl sulfone group ($-CH_2CH_2SO_2-$), e.g. Cl Reactive Violet 4 and Cl Reactive Black 5; B is $-CH_2CH_2-$, $-CH_2CH_2CH_2-$, or

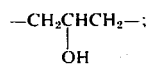

A is $-O-$ or $-S-$; and X is $-H$, $-CH_2OH$, $-CH_2OCH_3$, or

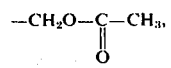

which dyestuff will dye a cellulosic material by heating in the presence of an acid catalyst. The cellulose-dyeing dyestuff of the invention is prepared by reacting a conventional cellulose-dyeing dyestuff having a chromophoric radical containing the aforesaid vinyl sulfone groups (e.g., Cl Reactive Black 5 and Cl Reactive Violet 4) with a hydroxy carbamate, and methylolating the resulting product. The utility of conventional cellulose-dyeing dyestuffs, which are normally reactive with cellulosic materials under alkaline conditions, is greatly extended by converting them to the methylolated derivatives of the invention, through prolonged shelf life and compatibility with selected acidic catalysts.

2 Claims, No Drawings

METHYLOLATED REACTION PRODUCT OF A HYDROXY CARBAMATE AND A CELLULOSE-DYEING DYESTUFF CONTAINING VINYL SULFONE GROUPS

This application is a division of Ser. No. 143,168 filed May 13, 1971, now U.S. Pat. No. 3,873,513, which was a division of Ser. No. 791,697, filed Aug. 6, 1968, now abandoned.

This invention relates to dyestuffs useful in dyeing cellulosic textiles. Specifically this invention relates to a wide variety of dyes which are generally applied to cotton and other cellulose containing textiles from acid media, to the preparation of the said wide variety of dyes, and to the application of these new colorants to cotton and other cellulose containing textiles. More specifically, this invention relates to dyestuffs which are converted from alkaline reactive dyes to derivatives of the same dyes that are reactive under acidic conditions.

The instant invention teaches to those who would practice the invention that the dyestuffs produced by the method of the instant invention (1) can be applied from acidic medium, (2) can be stored indefinitely with the selected catalyst incorporated in the solution and without the dyestuff suffering decomposition, and (3) when applied to cellulosic textiles the fixation of the colorant onto the textile can be postponed indefinitely.

The advantage to (1) the application of the dyestuff from acidic medium is that a dye which is normally applied from basic medium can be converted to application in acid medium in order to incorporate a preferred acid catalyst. The advantage to (2) being able to store the prepared dyebath is that if a solution containing all the ingredients is stored without this advance to the state of the art the dyestuff may suffer decomposition, whereas a solution prepared by the method of the instant invention would have excellent "shelf life." One advantage to (3) postponement of the fixation of colorant onto the cellulosic textile is that if the stored textile contains an impregnated colorant which is not fixed said colorant can be removed without harm of any sort to the fabric.

The science and technology of textile dyeing have advanced so that dyestuffs are available which are reactive with the textile material so as to produce a covalent bond between the textile substrate and the dyestuff. A number of reactive dyes for cellulosics are well known to those skilled in the textile processing art. Among these are chloro-pyrimidine, chloro-triazine, vinyl sulfone, and acrylamide type reactive dyes, all of which are applied to the cellulosic textile under alkaline conditions.

In the prior art we find few reactive dyes available for application under acidic conditions. Chromophore-containing derivatives of epoxy, aziridinyl, and triazinone compounds (see U.S. Pat. No. 3,152,111) have been described which can be applied under acidic catalysis to color cellulosics. The reactive functions in these dyes are similar to those found in certain textile finishing agents. Problems associated with each type of functions are well known to those skilled in the art, namely, water and storage stability for epoxy and aziridinyl compounds and the relatively poor durability of triazinone finishes.

In the prior art we find that inventor Stanley discloses in U.S. Pat. No. 3,248,379 a somewhat related dyestuff. On cursory view of the cited dye structure the unskilled may indicate a kinship of the Stanley dye, column 1, lines 51–54, to the structure of the dyes of the instant invention; however, the structures are different, as shown below.

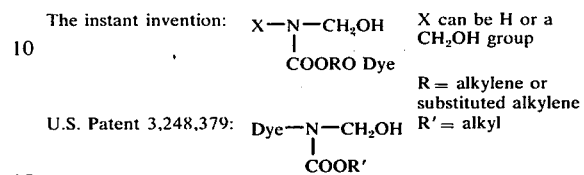

The instant invention discloses a carbamate with the colored moiety attached to the ester portion of the molecule, whereas U.S. Pat. No. 3,248,379 discloses the colored moiety attached to the amide portion of the molecule.

The main object of the instant invention is to provide a new class of dyestuffs containing an N-hydroxymethyl-substituted carbamate in which the chromophoric moiety is attached through the ester group of the carbamate structure.

The second object of the instant invention is to provide stability against hydrolysis of a dyestuff in the presence of water.

The third object of the instant invention is to provide for postponement of fixation on a dyestuff applied on a substrate.

Other objects and further scope of the applicability of the instant invention will become apparent upon reading the detailed description throughout the specification. As an example, rather than the dye moiety, the moiety could readily comprise other substituent groups capable of imparting select properties, such as bactericidal character, water repellency, soil repellency, oil repellency, and other useful properties to the substrate.

Among the advantages of the present invention are potentially lower cost because of lower cost intermediates, relatively mild acidic catalysts needed in application to cellulosic material, the outstanding durability of the color because of the particularly stable amidomethyl ether linkage to cellulose which methylolated carbamates produce, and excellent stability of the dyestuff in water or on fabric subsequent to reaction with the substrate.

In accordance with this invention, cellulose-dyeing dyestuffs of the following formula have been discovered:

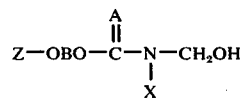

wherein Z is the chromophoric radical of a cellulose-dyeing dyestuff containing a vinyl sulfone group ($-CH_2CH_2SO_2-$), e.g., Cl Reactive Violet 4 and Cl Reactive Black 5; B is $-CH_2CH_2-$, $-CH_2CH_2CH_2-$, or

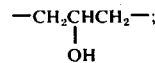

A is —O— or —S—; and X is —H, —CH$_2$OH, —CH$_2$OCH$_3$, or

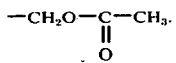

The new dyestuffs are made by the interaction of the vinyl sulfone group contained in the chromophoric radical of the dyestuff, such group containing active sulfone groups, active vinyl groups, and the like with a hydroxy carbamate to form a dyestuff intermediate having a carbamate structure attached thereto. This intermediate is methylolated with at least a molar equivalent of formaldehyde to form the reactive dyestuffs of this invention.

Hydroxy carbamates suitable for use in this invention are compounds that contain but are not limited to the following structure:

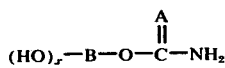

wherein A is —O— or —S—, and
B is —CH$_2$CH—, —CH$_2$CH$_2$CH$_2$—, or

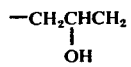

and
x = 1 or more.
Some examples are:

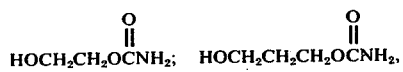

and

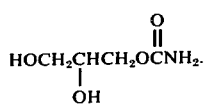

These carbamates can be prepared by substantially any of the known processes for producing such compounds. In one such route, they can be prepared by reaction of ammonia with ethylene carbonate, substituted ethylene carbonate, or the thio derivatives.

Chromomorphic radicals of conventional cellulose-dying dyestuffs suitable for use in the preparation of dyestuff by this invention, are derived from compounds that contain but are not limited to the following type structures:

wherein R is a member of the group consisting of HSO$_3$—dye—OCH$_2$CH$_2$—,

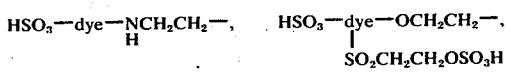

and

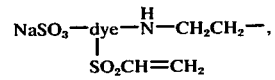

and R' is a member selected from the group consisting of CH$_2$=CH—, —CH$_2$CH$_2$OH, —CH$_2$CH$_2$OSO$_3$H, —CH$_2$CH$_2$X (wherein X is any halogen) and —CH$_2$CH$_2$OCH$_3$.

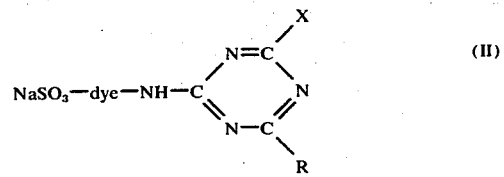

wherein R is a member of a group consisting of NaSO$_3$—dye—NH—, a halogen, or

and X is a halogen selected from a group consisting of chlorine, bromine, or fluorine. The manner in which the halotriazines are made does not in any way limit their utility in this invention. Some examples of chlorotriazines are given below but the invention is not limited to these examples:

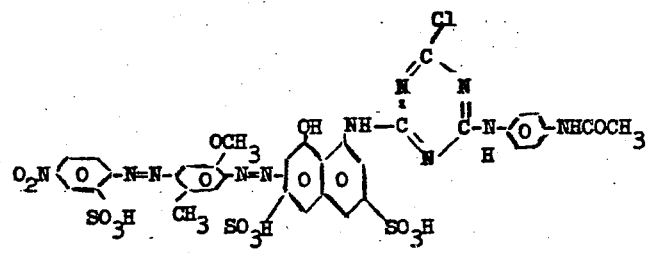

BLUE

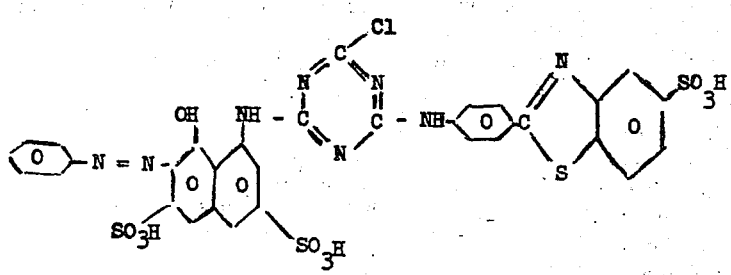

PINK

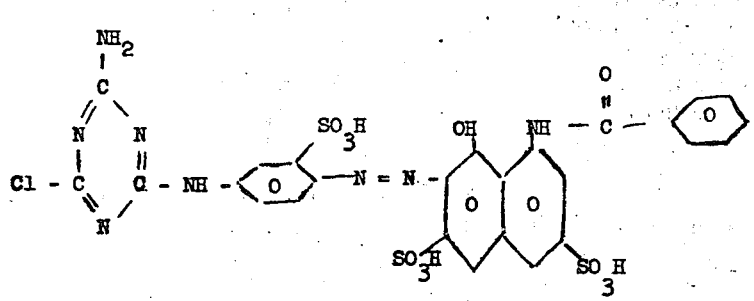

PURPLE

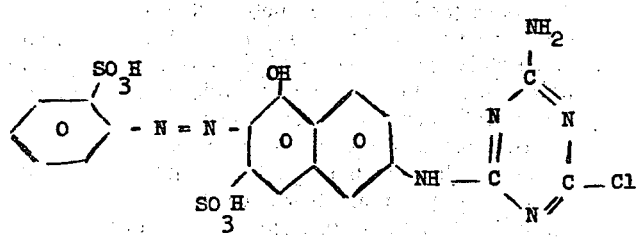

ORANGE

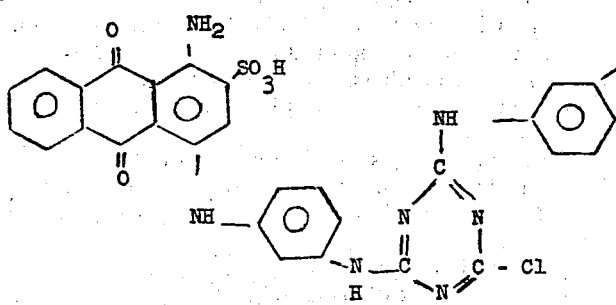

BLUE

The only limiting requirement of such chromophoric radical is that they contain a functional group reactive to the hydroxyl group of the carbamate structure.

In preparing the dyestuffs of the invention, the desired chromophoric radical is attached to the hydroxy carbamate by reaction to form the intermediate as shown hereunder.

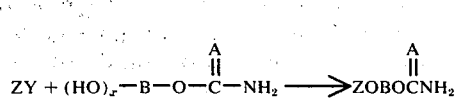

where Z is the color-containing moiety, Y is a group reactive to —OH, B is —CH$_2$CH$_2$—, —CH$_2$CH$_2$CH$_2$—, or

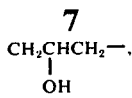

$x = 1$ or more, and A is —O— or —S—.

Conveniently, the reaction is accomplished by adding to one mole of the hydroxy carbamate, a measured amount of the dyestuff in the absence of water and then making alkaline with sodium hydroxide. The measured amount may be more than, equal to, or less than a molar equivalent of the hydroxy carbamate. The reaction mixture is then heated to an elevated temperature, conveniently on a steam bath, to form the intermediate. The intermediate need not be separated or isolated. To this solution is added neutralized formalin containing at least one or more molar equivalents formaldehyde. The desired N-hydroxymethyl-substituted carbamate dyestuff is formed according to the following equations:

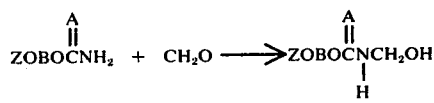

or

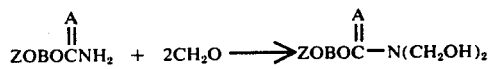

In forming the N-hydroxymethyl-substituted carbamate dyestuffs, it is preferable to carry out the reaction at a temperature above 20°C. The resultant dyestuff is then acidified to a pH of 6.0 or less.

The new reactive dyestuffs of the invention are especially suited for the coloration of cellulosic textile materials such as cotton, linen, and viscose rayon. Textile material containing a substantial amount of cellulosic fiber blended with other fibers also may be treated by the process of this invention.

The dyestuffs are applied by treating the textile material in an aqueous solution (which may be thickened as a printing paste) in the presence of an acidic or latent acidic material such as zinc nitrate, magnesium chloride, zinc fluoborate, zinc chloride, and the like. The acidic catalyst may be added to the dye bath prior to, simultaneously with, or after the addition of the dyestuff.

Dyeing in the presence of latent acidic catalyst preferably is carried out at elevated temperatures, for example, between about 60° and 200°C in order to improve the exhaustion and fixation of the dyestuff. It is preferable to heat cellulosic materials at 120°C or higher for a short period of time after application of the dyestuff and latent acidic catalyst. The textile material may be dried if desired and stored for prolonged periods prior to dyestuff fixation. In this manner it becomes possible to readily remove the dyestuff and reapply.

To summarize, the present invention provides (I) a new class of reactive colorants, (II) a method of preparing these new colorants, and (III) a process comprising postponement of fixation when these new colorants are applied to cellulosic textiles. More specifically the invention can be described as:

I. A dyestuff of the general formula

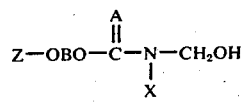

wherein Z is the chromophoric radical of a cellulose-dyeing dyestuff containing a vinyl sulfone group; B is —CH$_2$CH$_2$—, —CH$_2$CH$_2$CH$_2$—, or

—CH$_2$CHCH$_2$—;
     |
     OH

A is —O— or —S—; and X is —H, —CH$_2$OH, —CH$_2$OCH$_3$, or

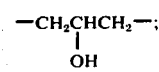

II. A method of converting a cellulose-dyeing dyestuff which is generally reactive with hydroxyl groups under basic conditions to a cellulose-dyeing dyestuff which is capable of reacting with hydroxyl groups under acidic conditions, comprising
a. mixing a cellulose-dyeing dyestuff having a chromophoric radical containing a vinyl sulfone group with hydroxyalkyl carbamate in a weight to weight ratio of about 1:3, and adjusting the pH to about 8 to 10,
b. heating the mixture for about from 40 to 2880 minutes at temperatures about from 25° to 100°C., using the longer periods of time with the lower temperatures, to obtain a dyestuff intermediate,
c. cooling the intermediate to about 25°C (room temperature),
d. mixing the cooled intermediate of (c) with about from 2.3 to 4.6 parts of a 36.3% formaldehyde solution (a molar ratio of about from 1:1 to 1:2 of hydroxyalkyl carbamate to formaldehyde),
e. adjusting the pH of the mixture of (d) to about from 8 to 10,
f. heating the adjusted mixture for about from 30 to 45 minutes at about 100°C to obtain the new reactive dyestuff, and allowing the mixture to cool to about 25°C,
g. adjusting the pH of the final mixture to below 7,
h. adding an acid-type catalyst to the adjusted final mixture, and
i. storing the catalyzed dyestuff mixture for an extended, indefinite period of time until needed and without fear of hydrolysis of the dyestuff during storage; and III. A process for facilitating postponement of fixation of reactive dyestuffs applied on cellulosic textiles, comprising:
a. impregnating the cellulosic textile with an aqueous solution containing an acidic catalyst and a dyestuff of the general formula:

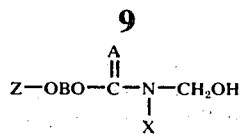

wherein Z is the chromophoric radical of a cellulose-dyeing dyestuff containing a vinyl sulfone group; B is —CH$_2$CH$_2$—, —CH$_2$CH$_2$CH$_2$—, or

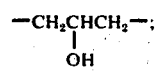

A is —O— or —S—; and X is —H, —CH$_2$OH, —CH$_2$OCH$_3$, or

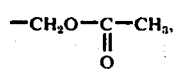

b. centrifuging the wet, impregnated textile to remove excess liquid, c. drying the wet, impregnated material for about 7 minutes at about 60°C, d. storing the dry, impregnated, cellulosic textile for about from 0 to 70 days at ambient temperatures, and e. heating the stored, dry, impregnated, cellulosic textile for about from 3 to 4 minutes at about 160°C to effect fixation.

The detailed description and specific examples while indicating preferred embodiments of the instant invention are provided only to illustrate the invention and should not be construed as limiting the scope of the instant invention in any manner whatever. Numerous changes and modifications within the spirit of the invention will become apparent to those skilled in the art.

EXAMPLE 1

3.5 grams of the yellow chromophore Cl Reactive Yellow 4, having the formula

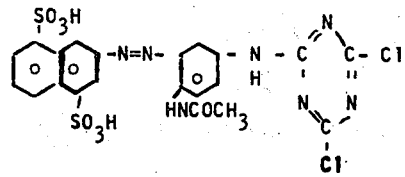

and providing the chromophoric radical

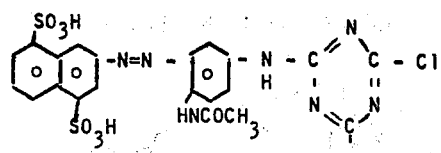

containing the chlorotriazinyl group

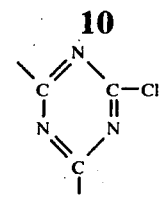

are added to 10.5 grams (0.1 mole) of hydroxyethyl carbamate and to this mixture is added sodium hydroxide solution to make a pH of 8–10. The solution is heated on a steam cone for 40 minutes, then cooled to obtain the intermediate. There is then added 8 grams (0.1 mole) of neutralized 36.3% formalin and the mixture is heated 30 minutes on a steam cone, cooled to room temperature, and allowed to stand 16 hours. The solution is adjusted to below pH 7 with 6N hydrochloric acid and allowed to stand until ready for application.

To the above solution is added 76 ml distilled water and 4 ml of 25% zinc nitrate hexahydrate solution. An 80 × 80 cotton printcloth (Sample 1) is thoroughly saturated with the solution, centrifuged to remove excess liquid, then dried 7 minutes at 60°C and heated 3 minutes at 160°C for fixation, washed, and dried.

3.5 grams of said yellow chromophore containing chlorotriazinyl group (CI Reactive Yellow 4), the starting material, is added to a solution containing 92.5 ml distilled water and 4 ml of 25% zinc nitrate hexahydrate solution. The solution is acidified with 6N hydrochloric acid and applied to an 80 × 80 cotton printcloth (Sample 2) as done for Sample 1. The fastness of the dye in Sample 1 was much greater than that of the colorant of Sample 2.

EXAMPLE 2

The procedure of Example 1 is repeated using as a starting material the red chromophore Cl Reactive Red 7 having the formula

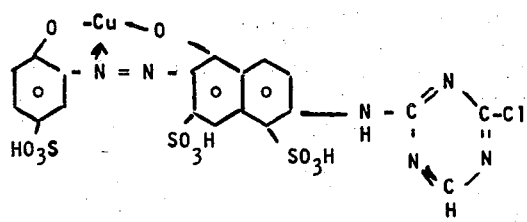

and providing the chromophoric radical

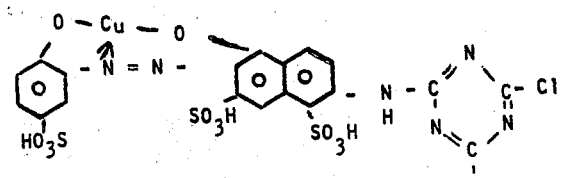

containing the chlorotriazinyl group

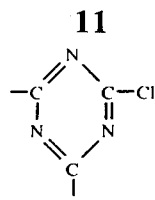

The fastness of the dyeing to washing of the carbamate dyestuff is once again greater than that of the colorant from which the new dyestuff is prepared.

EXAMPLE 3

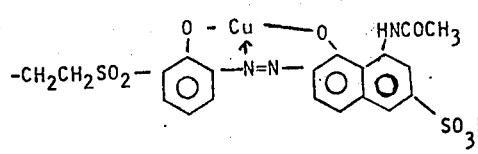

is added to 10.5 grams (0.1 mole) of hydroxyethyl carbamate and to this mixture is added sodium hydroxide solution to obtain a pH 8–10. The ingredients of the solution were allowed to react for 48 hours at 25°C to obtain the intermediate. 16 grams (0.2 mole) of 36.3% formalin at pH 10 is then added and the mixture is heated 45 minutes on a steam cone and the solution cooled. 82 ml of distilled water is added and the pH adjusted to 5.7 with a solution of hydrochloric acid and then 4 ml of 25% zinc nitrate hexahydrate solution is added. The procedure to treat Sample 1 was followed for Sample 5.

3.5 grams of CI Reactive Violet 4, the starting material is added to 92.5 ml of distilled water and the pH adjusted to 5–6 with solution of hydrochloric acid. 4 ml of 25% zinc nitrate hexahydrate solution is then added. The solution is then applied to Sample 6 following the procedure for Sample 5. The fastness of the dye of Sample 5 to washing is much greater than that of the colorant from which the new dyestuff is prepared (Sample 6).

EXAMPLE 4

The procedure of Example 3 is repeated using CI Reactive

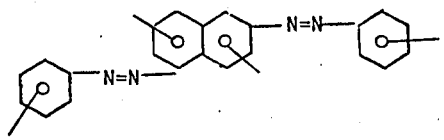

groups, as a starting material. The fastness of the dyeing to washing of the new carbamate reactive dyestuff on fabric is greater than that of the colorant from which it is prepared.

EXAMPLE 5

The solution of Example 2 containing the new dyestuff and zinc nitrate catalyst is stored in a stoppered glass flask for 15 months then it is applied to cotton printcloth following the procedure of Example 1. After drying at 60°C for 7 minutes two portions of sample are removed and the remaining portion is heated 4 minutes at 160°C. One portion of the dried sample is washed and dried with the portion heated to 160°C. The fastness of the dyeing to washing is far greater for the portion heated at 160°C than the other portion. This illustrates the stability of the new dyestuffs in the presence of water and acidic catalyst over prolonged periods of time. It also illustrates the ease of removal of the dye prior to fixation at an elevated temperature. It also shows that the reaction to cause chemical union between the dyestuff and the cellulose occurs at elevated temperature and that fastness is not achieved until this chemical union occurs.

The third portion, dried only, was stored 10 weeks then cut into two parts. One part was heated 4 minutes at 160°C to effect dye fixation. The remaining part of the dried sample is washed and dried with the part heated to 160°C. The fastness of the dye to washing is far greater for the part heated at 160°C than the other part. Further, the fastness of the dye to washing is the same as the sample heated to 160°C immediately after drying.

EXAMPLE 6

The procedure of Example 5 was repeated using the solution of Example 4 which is stored 15 months in presence of water and acidic catalyst. The fastness of dyeing to washing was again greater for the heat fixed sample compared to the non-heat fixed sample.

We claim:

1. A dyestuff having the formula

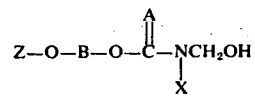

wherein Z is the chromophoric radical

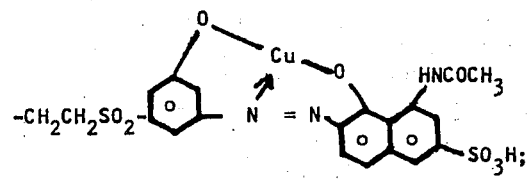

B is $-CH_2CH_2-$, $-CH_2CH_2CH_2-$, or

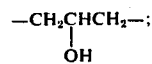

A is $-O-$ or $-S-$; and X is $-H$, $-CH_2OH$, $-CH_2OCH_3$, or

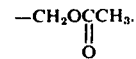

2. The dyestuff of claim 1 wherein Z is

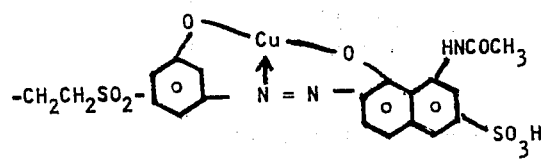

B is $-CH_2CH_2-$; A is $-O-$; and X is $-CH_2OH$.

* * * * *